United States Patent [19]
Paul

[11] 3,745,360
[45] July 10, 1973

[54] RADIATION CIRCUIT RADIATION DETECTOR

[75] Inventor: Bernt Paul, Erlangen, Germany

[73] Assignee: Siemens Aktiengesellschaft, Berlin & Munich, Germany

[22] Filed: Mar. 17, 1970

[21] Appl. No.: 20,213

[30] Foreign Application Priority Data
Mar. 21, 1969 Germany............... P 19 14 467.3

[52] U.S. Cl. .......................................... 250/83.3 H
[51] Int. Cl. ................................................ G01t 1/16
[58] Field of Search ................ 250/83.3 H, 83; 73/355; 317/235; 75/134 T; 148/133

[56] References Cited
UNITED STATES PATENTS
3,418,478 12/1968 Fabel ......................... 250/83.3 H
3,416,373 12/1968 Havens ........................ 317/235 Q
3,453,431 7/1969 Lederhander ............... 250/83.3 H
3,226,225 12/1965 Weiss et al. .................. 75/134 T
3,426,198 2/1969 Autrey ........................... 250/83 R

*Primary Examiner*—James W. Lawrence
*Assistant Examiner*—Davis L. Willis
*Attorney*—Curt M. Avery, Arthur E. Wilfond, Herbert L. Lerner and Daniel J. Tick

[57] ABSTRACT

A radiation detector for sensing radiation has a plurality of radiation-sensitive resistances arranged in a bridge circuit, the latter being formed from a crystal so as to be a monolithic entity. The crystal consists of a material having a resistivity sensitive to radiation, whereby the bridge circuit becomes electrically unbalanced when a portion of the resistances is placed in the path of the radiation.

1 Claim, 4 Drawing Figures

RADIATION CIRCUIT RADIATION DETECTOR

DESCRIPTION OF THE INVENTION

My invention relates to a radiation detector having radiation-sensitive resistors arranged in a bridge circuit.

A passive detector is needed to obtain versatile and usable radiation detection. Such a detector has a high temperature sensitivity and should function without an optical mechanical chopper. A passive detector of this type is in the general case a radiation-sensitive resistance. This resistance can be supplied with an alternating current of a high carrier frequency and the drop in voltage on the detector can be amplified with a desired small bandwidth of the carrier frequency, the voltage drop being modified by the radiation. The radiation-sensitive resistance of such radiation detectors is advantageously connected in bridge circuits to achieve the highest efficiency. Such radiation detectors are based upon photoconduction (quantum process), or bolometric effect (thermal process) or upon both effects simultaneously. For temperature compensation, such a bridge circuit must consist of four resistances having the closest identical temperature dependence. This requirement is only satisfied at a very high investment in equipment, and therefore at great expense.

Accordingly, it is an object of my invention to provide a radiation detector of the aforedescribed type which is simple to construct, while at the same time being temperature compensated.

According to a feature of the invention, the entire bridge circuit is made from a monolithic crystal, the material of which has a radiation-sensitive value. And, according to another feature of the invention, the bridge circuit has at least one branch positioned so as to be exposed to the radiation.

Such a monolithic detector bridge is easily manufactured so as to be reproducible and symmetrical. The resistance relationships are limited only by a minimal tolerance. The resistances of the bridge branches therefore exhibit a practically identical temperature dependence.

In this way, an inexpensive component is obtained which can be mass-produced. It is to be noted that the small receiving surfaces, for example, those which are smaller than 1 mm², can be produced so that a radiation thermometer with a large distance ratio is realizable. That is, with the detector of the invention it is possible to obtain a large ratio of the distance between the radiation thermometer and the subject being measured and the diameter of the smallest field of measure of the subject.

Preferably, two of the diagonal branches of the bridge are exposed to radiation. The branches which are exposed to radiation can be positioned next to each other. With this radiation-sensitive surface of the detector, which is formed by two diagonal branches of the bridge, the signal to noise ratio is doubled.

The monolithic bridge can be formed from a crystal strip closed upon itself or in the form of a loop and upon which four separate electrical connections are made. The closed or shaped crystal strip can be disposed within the periphery of a rectangle, whereby two electrical connections can be made to the strip at each of the long sides of the rectangle. Between the electrical connections at each long side of the enclosing rectangle, a bridge branch can be disposed which is subjected to the radiation. At least the bridge branches which are exposed to radiation are at least partially formed so as to be meander-shaped.

The crystal strip is preferably provided with a lateral projection for each of the electrical connections. The connections for the monolithic bridge are soldered to each of the projections. In this way, the resistance ratio is not influenced by the position of the solder drops and the contacts for the incoming current and the outgoing signal are affixed efficaciously in production line assembly.

It is advantageous to provide the regions of the monolithic bridge exposed to radiation, at least partially, with a radiation-absorbent layer which is electrically insulating and thermally conductive. The shield serves to at least partially bridge the space between the neighboring bridge parts. The material of the layer may be, for example, silicon oxide. The layer increases the workable receiver surface of the monolithic detector bridge and, especially with thin crystals, raises the absorption capacity. At the same time, the layer is an electrical insulator with respect to a supporting base.

It is preferable to mount the monolithic bridge on a good thermal conducting base that is electrically insulated. It is further preferable to arrange the bridge branches exposed to radiation so that they extend unsupported over a recess in the base and to arrange those bridge portions protected from radiation so that they lie on the base. The heat capacity of the base is great relative to that of the monolithic bridge. This construction is rugged and insensitive to shock. In addition, the temperature stability is improved by the selected ratio of the heat capacities. The thermal time constant of the detector is held small with respect to the carrier because the path through which the heat must travel from the receiving surface portions to the base or carrier is short.

Accordingly, it is another object of my invention to provide a radiation detector which is rugged and resistant to shock. It is still another object of my invention to provide a radiation detector having good temperature stability.

Preferably, the material of the bridge is indium antimonide or InSb, especially with inclusions of good conducting material or crystal formation such as nickel antimonide or NiSb. The inclusions are needle-like and disposed essentially perpendicular to the direction of current flow and perpendicular to the detector surface subjected to radiation. Semiconductor crystals with such inclusions, as well as the method of their manufacture, are described in U.S. Pat. No. 3,226,225 of H. Weiss et al, issued Dec. 28, 1965, and assigned to the assignee of the present invention.

In order that the invention may be readily carried into effect, it will now be described with reference to the accompanying drawing, wherein.

Figure 1:
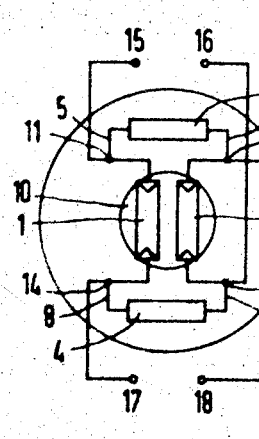
FIG. 1 is a schematic diagram of an embodiment of the detector bridge of the invention.

In FIG. 1, the resistances of the detector bridge are designated by reference numerals 1, 2, 3 and 4 and are interconnected by conductors 5, 6, 7 and 8. In a monolithic detector bridge, the resistances 1 to 4 and the conducting leads 5 to 8 are formed in a crystal. The resistances 1 to 4 and the leads 5 to 8 lie on and are electrically insulated from a carrier plate 9. The radiation-sensitive surfaces are constituted by the resistances 1 and 2, which correspond to two diagonal branches of the bridge. The resistances 1 and 2 extend unsupported over a recess in the carrier plate or base 9. The resistances 3 and 4 are comparison resistances and are protected from the radiation by a cover plate which is not illustrated in FIG. 1.

The bridge supply voltage is applied to the lines 5 and 6 via corresponding contacts 11 and 12. The bridge output voltage is derived from connecting leads 7 and 8 via contacts 13 and 14.

A reduction in resistance ($\Delta R$) brought about by impinging radiation on the two resistances 1 and 2 unbalances the bridge and develops, with a feed voltage $U_o$ supplied at the input terminals 15 and 16, the open-circuit signal voltage $U_s = U_o (\Delta R/2R)$ at the output terminals 17 and 18, where R is the resistance of each individual bridge branch 1, 2, 3 and 4 of the symmetrical bridge. Correspondingly, the equation for the short-circuit current $i_s = i_o (\Delta R/2R)$ applies for an extremely low resistance terminal condition assuming that $\Delta R/R \ll 1$. It is noted that the bridge can be adjusted to accommodate a desired radiation load by placing an additional resistance in parallel to one of the four bridge branches.

Intrinsic conducting or doped indium antimonide or InSb may be utilized as a material for the resistances 1 to 4 and the connecting conductors 5 to 8. The material is provided with inclusions of a good conducting phase such as NiSb or MnSb. The resistance value of such material is reduced under infrared radiation. The inclusions are needle-like. The monolithic detector bridge is formed in the crystal, so that in the resistances 1 and 2 which constitute the radiation-sensitive surfaces, the needle-like inclusions are disposed so that they are perpendicular to the surface of the detector exposed to radiation and perpendicular to the direction of the electric current flow. The increase in conductive capacity under the influence of the infrared radiation occurs because of two different effects. When the wavelength is under 7 $\mu$m, direct photoconductivity is workable as with homogenous InSb, that is, the excitation from intrinsic conduction by means of the direct formation of electron-hole pairs by the absorption of quanta of sufficient energy. At wavelengths over 7 $\mu$m, there is still an indirect photoconduction workable in two-phase InSb-MnSb. The needle-like inclusions exhibit an absorption increase as opposed to InSb, for example, with NiSb needles by a factor of about 50, so that the absorption constant K takes on a value of about 200 cm$^{-1}$ between 10 $\mu$m and 20 $\mu$m.

This effect is described in an article by B. Paul and H. Weiss appearing in Solid State Electronics, (11, 979), (1968). In the aforedescribed example, the depth of penetration of the infrared radiation in the mid K$^{-1}$ range is about 50 $\mu$m. The absorbed radiation power operates as an inner heat source and heats the crystal. In this manner, the intrinsic conduction of the charge carriers is increased and an indirect photoconduction is obtained corresponding to a temperature coefficient of the conductivity of 1 to 2 percent. The indirect photoconductivity is like that obtained with a radiation bolometer.

Figure 2:
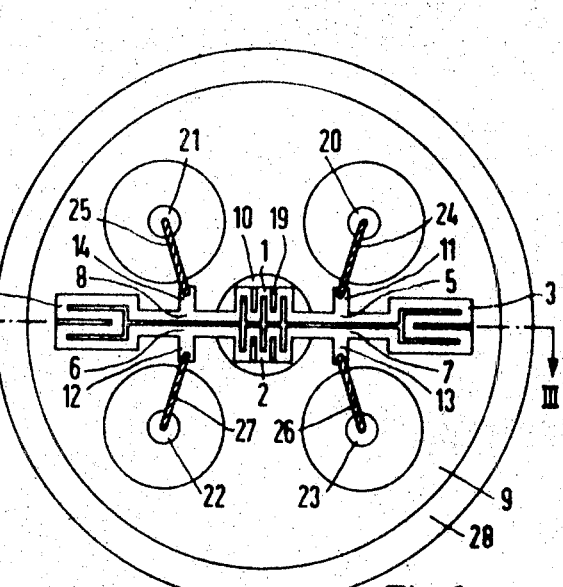
FIG. 2 is a plan view of an embodiment of the detector of the invention.

In FIG. 2, the monolithic detector bridge comprises a crystal strip which is loop-shaped or closed upon itself and is contained within the periphery of a rectangle. The resistances 3 and 4, which are shielded from the radiation, are arranged at the short sides of the rectangle and are formed so as to have a sinuous or meander-like shape. The long sides of the subscribing rectangle are formed with the connecting leads 5 to 8, and likewise, with the sinous or meander-shaped resistances 1 and 2. On the connected crystal strips 5 to 8 are provided lateral projections 11 to 14 which serve as connections into the bridge. As already mentioned, this prevents the resistances of the bridge branches from changing because of the position of the solder drops on the contacts.

The resistances 1 and 2, which are not protected from the radiation and which provide the radiation-sensitive surfaces, are arranged so as to extend unsupported over a recess 10 in the carrier plate 9. Since the heat capacity of the carrier plate 9 is large with respect to the heat capacity of the monolithic detector, a large temperature stability is achieved with this construction. In addition, as a result of the rugged construction, the detector bridge is resistant to shock, because on the one hand, it is secured to the carrier plate 9 and, on the other hand, it is free to swing over the recess 10.

The monolithic detector bridge is made from a 70 $\mu$m thick crystal wafer by means of the known photo-etching process. With this production process, a component is obtained having very tight tolerances which provide the aforementioned advantages. The radiation-sensitive surface provided by the meander-like resistance is approximately 3 mm$^2$ large. This surface may be reduced to under 1 mm$^2$ only at considerable expense.

The monolithic detector bridge is cemented to the carrier plate 9 so that it is electrically insulated therefrom. To obtain electrical insulation, the upper surface of the carrier plate 9 and the surface of the monolithic detector bridge facing away from the radiated upper surface may be provided with an electrically insulating and thermally conductive layer of material. These layers may consist of SiO, for example. In addition, with the layer 19 at the back side of the monolithic detector bridge, the spaces between the neighboring bridge parts are bridted. The bridging layer 19 is recognizable at the intermediate spaces of the meander-like resistances 1 and 2 in FIG. 2. Because of this layer of material, in addition to achieving an increased electrical insulation, the effective receiving surface is enlarged, so that with a SiO layer, an absorption maximum of about 9 $\mu$m is obtained.

Lead through conductors 20, 21, 22 and 23 are cast into the carrier plate 9 and are connected via the connecting leads 24, 25, 26 and 27 to the contact arms 11 to 14 of the monolithic detector bridge.

At its periphery, the carrier or base 9 is provided with a ring-shaped raised portion 28 on which the cover plate can be disposed for protecting the resistances 3 and 4 against radiation. The cover plate is not illustrated in FIG. 2.

In a monolithic detector bridge made from an InSb-NiSb crystal and having a bridge-diagonal resistance $R_s$ of 30 ohms, the values for radiation sensitivity for a radiation detector of FIG. 2 are listed in the following chart. The values listed in column I are obtained with a bridge supply voltage of 1.4 volt. The bridge power loss amounts to 65 mw. A conventional amplifier and a silicon lens having an aperture ratio of 1:2.2 were used with these measurements. The lens served to project the radiating object being measured on the detector bridge. In column II, the theoretically optimal values are given. These were calculated using exclusively thermal noise. With the use of an optimal, especially low noise amplifier, the measured values substantially approach the optimal values. The thermal time constant of the monolithic detector amounts to about 300 ms.

Chart

| Quantity | Symbol | I | II | Dimension |
|---|---|---|---|---|
| Smallest Measureable Radiated Power at $\tau=0.33$ s | $N_N$ | $1.8 \times 10^{-7}$ | $1.5 \times 10^{-10}$ | W |
| Noise Power Equivalent | NEP(150 °C, 0.1) | $2.7 \times 10^{-7}$ | $2.2 \times 10^{-10}$ | W Hz$^{-1/2}$ |
| Detection or Measuring Capability | D*(150°C, 0.1) | $6.5 \times 10^{5}$ | $7.9 \times 10^{8}$ | cm W$^{-1}$Hz$^{1/2}$ |
| Radiated Power Sensitivity | $dU/dN_{St}$ | $2.2 \times 10^{4}$ | 3.4 | VW$^{-1}$ |
| Temperature to Which Measurements Can Be Made | $\Delta$Tmin/150°C | 0.17 | | degrees |
| | $\Delta$Tmin/35°C | 0.36 | | degrees |
| Temperature Sensitivity | dU/dT/150°C | 24 | | mV/degree |
| | dU/dT/35°C | 11 | | mV/degree |

Figure 3:
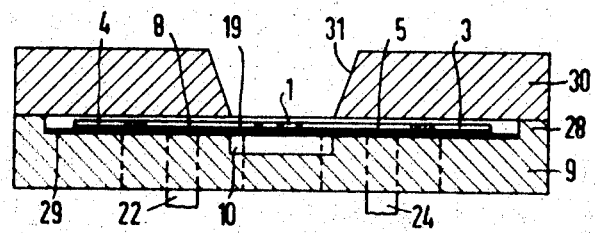
FIG. 3 is an elevation view, in section, of the detector of FIG. 2, taken along the line III—II of FIG. 2.

FIG. 3 is a section of the detector of FIG. 2 taken along the lines III—III of FIG. 2. FIG. 3 illustrates the arrangement of the resistances 1 and 2 of the monolithic detector bridge extending unsupported over the recess 10. The resistances 3 and 4 and the principle part of the connecting leads 5 to 8 are cemented on the carrier plate 9 and are insulated therefrom by the insulation layer 19 on the back face of detector bridge and by the thermal conducting insulation layer 29 applied to the base or plate 9. In addition, FIG. 3 shows the cover plate 30 which is polished, silver coated and provided with a bore 31. The bore 31 is positioned over the recess 10. The balancing resistances 3 and 4 are protected from the impinging radiation by the plate 30.

Figure 4:
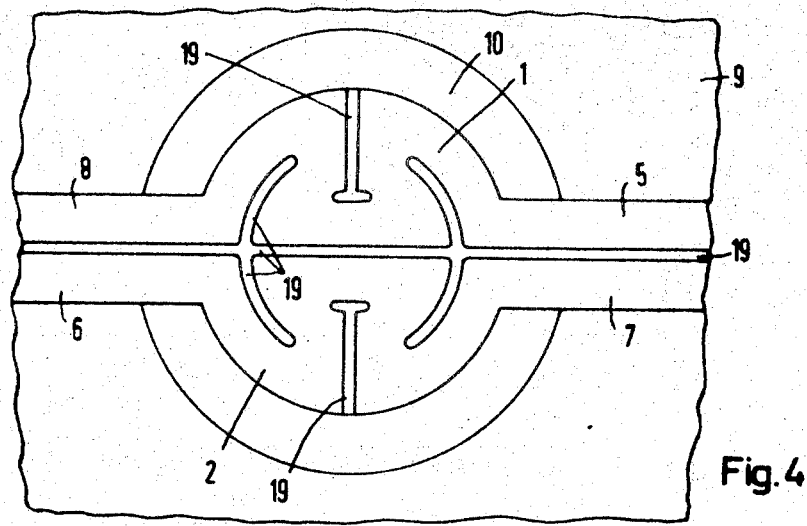
FIG. 4 is a plan view of another embodiment of the bridge resistances of the detector bridge of the invention.

FIG. 4 shows, in section, another configuration of the resistances 1 and 2 which constitute radiation-sensitive surfaces of the monolithic detector bridge. In this embodiment also, the resistances 1 and 2 have a meander-like shape. The total shape is selected so that the resistances 1 and 2 form a circular-shaped surface. FIG. 4 shows the position of the thermal conducting insulation layer 19 in the spaces between the neighboring bridge portions.

The monolithic detector bridge of the invention is reproducibly produced in a simple manner. The monolithic detector bridge is sensitive with regard to radiation temperature, free from noise, has a small surface and is insensitive to variations in operating temperature. In addition, the bridge does not require cooling and may be used in any desired position. Also, the bridge is rugged and resistant to shock.

While the invention has been described by means of specific examples and in a specific embodiment, I do not wish to be limited thereto, for obvious modifications will occur to those skilled in the art without departing from the spirit and scope of the invention.

I claim:

1. A radiation detector for sensing radiation comprising a plurality of radiation-sensitive resistances arranged in a bridge circuit, said bridge circuit being formed from a crystal so as to be monolithic, said crystal consisting of material having a resistivity sensitive to radiation, whereby said bridge circuit becomes electrically unbalanced when a portion of said resistances is placed in the path of radiation, a thermal conducting carrier for supporting said monolithic bridge circuit in electrically insulating relation thereto, said carrier having a recess, said portion of said resistances being disposed so as to extend unsupported over said recess, and means disposed over said monolithic bridge circuit for protecting the remaining portion of said resistances from radiation.

* * * * *